Patented Nov. 11, 1947

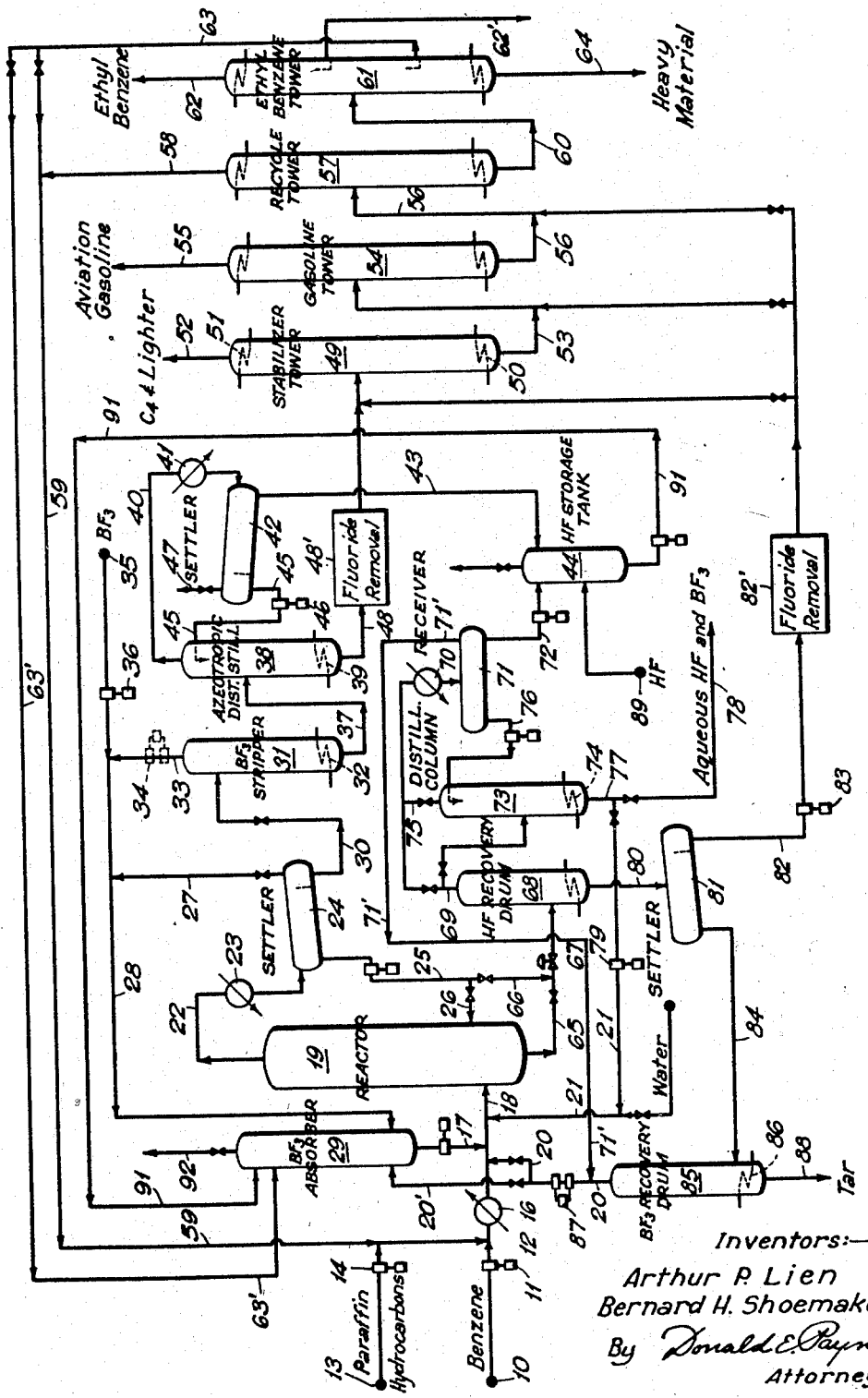

2,430,516

UNITED STATES PATENT OFFICE 2,430,516

CATALYTIC ALKYLATION OF AROMATIC HYDROCARBONS BY NORMAL PARAFFINS

Arthur P. Lien and Bernard H. Shoemaker, Hammond, Ind., assignors to Standard Oil Company, Chicago, Ill., a corporation of Indiana Application August 14, 1944, Serial No. 549,455

14 Claims. (Cl. 260—671)

This invention relates to a hydrocarbon conversion process and it pertains more particularly to the conversion of an aromatic hydrocarbon such as benzene with a paraffin hydrocarbon such as normal pentane, hexane, heptane, etc., to produce ethylbenzene and a high antiknock aviation gasoline blending stock, said conversion being effected by the use of hydrogen fluoride promoted by boron fluoride.

Ethylbenzene is of great commercial importance for the synthesis of artificial rubber and for many other purposes. Prior methods for producing ethylbenzene have required the use of olefins, have presented many difficulties in operation and have been relatively expensive. An object of our invention is to provide a simple, efficient and relatively inexpensive process for producing ethylbenzene. A further object is to avoid the necessity of concentrating or even employing olefins in the process. A further object is to provide a process for the simultaneous production of ethylbenzene and valuable by-products such as a remarkably high knock rating aviation gasoline blending stock, toluene, etc.

A further object of our invention is to produce ethylbenzene and other valuable products from aromatics and readily available cheap hydrocarbons which are not themselves valuable gasoline components or synthesis materials and to convert such hydrocarbons into valuable components and synthesis materials simultaneously with the production of ethylbenzene. A further object is to employ such charging stocks and operating conditions as will enable the production and recovery of desired reaction products in relatively pure state; in other words, to avoid the presence or production of undesirable hydrocarbons of approximately the same boiling range as that of the desired products.

A further object of our invention is to provide an improved method and means for effecting hydrocarbon conversion with a hydrogen fluoride-boron fluoride catalyst whereby such catalyst may be used with maximum effectiveness and with minimum losses. A further object is to provide an improved method and means for recovering hydrogen fluoride, boron fluoride and valuable aromatic hydrocarbons from the relatively spent catalyst material or complex which is produced in the reaction.

In practicing our invention we contact a mixture of an aromatic hydrocarbon such as benzene, toluene, more highly alkylated benzenes or mixtures thereof with a paraffin hydrocarbon having at least five carbon atoms per molecule such for example as normal pentane, normal hexane, normal heptane, etc. although it should be understood that branched-chain paraffins may be employed as well as normal paraffins. The charge should be as free from olefins and naphthenes as is commercially feasible because olefins tend to form alkyl fluoride and naphthenes interfere with the selectiveness of the reaction and make product recovery more difficult. The reaction itself is not one of simple condensation or alkylation but is a complex reaction which involves alkylation or condensation along with cracking or splitting and isomerization reactions.

It is known that aromatics can be alkylated with olefins by means of such catalysts as aluminum chloride, hydrogen fluoride, aluminum chloride promoted by hydrogen chloride, hydrogen fluoride-boron fluoride mixtures, etc.; an important feature of our invention is the provision of a process which does not require the use of olefins or halogenated hydrocarbons but which can utilize normal paraffins. Aromatics have been alkylated with paraffins with such catalysts as sulfuric acid (U. S. 2,233,866) phosphoric acid (U. S. 2,098,045) and aluminum chloride-hydrogen chloride catalysts (U. S. 2,088,598). The sulfuric and phosphoric acid processes do not yield ethylbenzene in desired amounts and the aluminum chloride-hydrogen chloride process is characterized by high catalyst consumption and the formation of tarry sludges which not only consume a substantial part of the charging stock but render efficient recovery of catalyst practically impossible. In our invention we employ hydrogen fluoride along with about 2 to 20 weight percent of boron fluoride as the catalyst. Neither hydrogen fluoride nor boron fluoride by itself will produce the desired results.

The relative portion of boron fluoride to hydrogen fluoride is important. The use of too much boron fluoride results in excessive amounts of aromatics dissolving in the complex or catalyst layer which in turn requires an unduly high recycle ratio of complex for product and catalyst recovery. The use of too small amounts of boron fluoride leaves the aromatics undissolved and outside the sphere of catalytic influence and catalyst is not active enough to break down the paraffins to provide fragments for the alkylation reaction. While 2 to 20% of boron fluoride is the preferred range for maximum catalyst effectiveness it should be understood that beneficial results may be obtained with the presence of only about 1% of boron fluoride or an even lesser amount thereof and in some instances beneficial results may be obtained with the presence of even more than 20% by weight of boron fluoride. The catalyst should be substantially but not absolutely anhydrous since a trace of water (0.01 to 1%) may improve the catalyst activity and water contents of 2 or 3% by weight may be used.

The conversion may be effected at a temperature within the approximate range of 180 to 400° F.; the higher temperatures being employed with relatively low boron fluoride concentrations and the lower temperatures being employed with relatively high boron fluoride concentrations. The pressure should be sufficient to maintain substantially liquid phase conversion conditions and may be within the approximate range of about 200 to 2000 pounds per square inch. The time of contact will be somewhat dependent upon catalyst composition and temperature employed and may range from about a minute to several hours. The space velocity in a continuous reaction system may be within the approximate range of about .2 to 4 volumes of hydrocarbon charging stock per hour per volume of catalyst in the reaction zone.

Since boron fluoride is an expensive reagent it is essential that its losses be minimized. When light hydrocarbon gases such as methane must be purged from the system the problem of avoiding boron fluoride losses is considerably augmented. In our invention we absorb the tail gases from the hot settler following the reactor and/or from the boron fluoride stripper in an absorber liquid which may be relatively cool incoming hydrogen fluoride maintained at sufficient pressure so that the boron fluoride is absorbed or bound while hydrocarbons are substantially unabsorbed so that they may be removed in the liquid or gaseous state. A particularly desirable absorber liquid is an intimate mixture of an aromatic hydrocarbon, such for example as diethylbenzene, with hydrogen fluoride because boron fluoride forms a complex with such intimate mixtures or solutions and hence may be readily separated from other gases at pressures as low as atmospheric pressure.

The relatively spent catalyst material (which is a liquid mass containing catalyst complex, tarry material, dissolved catalyst components, aromatics, etc.) is reduced to a relatively low pressure and heated to about 90 to 200° F., preferably 100 to 160° F., to drive off dissolved or loosely bound hydrogen fluoride and boron fluoride, thus liberating substantial amounts of aromatic hydrocarbons from combination with the boron fluoride-hydrogen fluoride-hydrocarbon complex. The heated material is then allowed to settle for the separation and recovery of aromatic hydrocarbons. The remaining material is then heated to a higher temperature of about 200 to 500° F. for decomposing any complex present and thus recovering residual boron fluoride and hydrogen fluoride. A preferred temperature range is 230 to 350° F. when the operation is carried out at substantially atmospheric pressure, higher temperatures being required when higher pressures are employed. The boron fluoride and hydrogen fluoride thus recovered may be absorbed, compressed or otherwise returned to the reactor.

Hydrogen fluoride may be recovered from the product stream by azeotropic distillation. Since no olefins are employed in the charging stock the problem of removing alkyl fluorides is greatly minimized if not entirely eliminated. The product stream will consist of a relatively few hydrocarbons so that the desired products can be readily separated from each other by simple fractionation. By operating in the absence of naphthenes the reaction itself is remarkably more selective and the product separation is greatly simplified. The aromatic-paraffin cut is recycled while ethylbenzene, a high antiknock aviation gasoline blending stock, and ethyltoluene are withdrawn as separate streams.

The invention will be more clearly understood from the following detailed description read in conjunction with the following drawing which forms a part of this specification and which is a schematic flow diagram of our improved continuous conversion process.

An aromatic hydrocarbon, such as benzene, an alkyl benzene or a benzene-alkyl benzene mixture is introduced from source 10 by pump 11 through line 12. A paraffin hydrocarbon containing at least five carbon atoms per molecule such as normal pentane, normal hexane, normal heptane, etc., or a mixture of such hydrocarbons with each other or with branched-chain paraffinic hydrocarbons, is introduced from source 13 by pump 14 and line 15. This hydrocarbon charge is passed through heater 16, admixed with catalyst from line 17 and introduced through line 18 at a low point in reactor 19.

The reaction may be effected in any suitable type of reactor on a batchwise, multiple batch, semi-continuous or continuous basis but we prefer to employ a continuous process with a tower-type reactor and to effect the conversion by passing the charging stock upwardly through the column of catalyst maintained in the liquid phase either with or without mechanical agitation. The reactor may be of the type generally used for effecting alkylation of olefins with isoparaffins as exemplified by U. S. 2,238,802 or it may be of the type described in U. S. 2,349,821 for effecting isomerization of paraffins. It may be about 5 to 50 feet in height and should be designed to withstand a maximum operating pressure which with the high temperatures may be as high as 2000 pounds per square inch. Before the reaction is initiated the reactor may be filled about half to three-fourths full of catalyst and heated by any conventional means to reaction temperature.

The ratio of aromatics to paraffin in the charging stock may vary throughout a relatively wide range and for maximum ethylbenzene production there should be a molecular excess of aromatics. Usually the aromatics: paraffin mol ratio is within the approximate range of 1:4 to 8:1 and in this specific example an equal mol ratio will be employed, i. e. about 3 volumes of benzene to 5 volumes of heptane. The catalyst in the reactor in this specific example is hydrogen fluoride with 5 weight percent (based on hydrogen fluoride) of boron fluoride. For each volume of hydrocarbon introduced into the reactor we may introduce about .05 to .5, e. g. about .1, volume of the catalyst mixture, the bulk of this mixture being introduced through line 17 but a portion of it being introduced through line 20. With a substantially anhydrous charging stock a tract of water may be added and/or a small amount of aqueous hydrogen fluoride through line 21 so that the catalyst in the reactor will contain about .01 to 1% but not substantially more than 2 or 3% by weight of water.

The reactor in this case may be operated at a temperature of about 300 to 330° F. and a pressure of the order of 1000 pounds per square inch. The charging stock passes upwardly through the liquid column of catalyst in the reactor and the bulk of the catalyst separates from the effluent product stream in the upper part of the reactor although some catalyst material is carried with the effluent product stream through line 22 and cooler 23 to separator 24. Catalyst material which settles out in this settler may be returned by lines 25 and 26 to the reactor. In this particular case the space velocity in the reactor may be about 1 volume of hydrocarbon charging stock per hour per volume of catalyst in the reactor.

The settler 24 may be operated at substantially reactor pressure and at sufficient elevation so that the liquid catalyst may flow by gravity back to the reactor. Alternatively we may employ a pressure reducing valve in line 22 and operate the settler at a much lower pressure, for example of the order of about 200 to 400 pounds per square inch in which case a pump will be employed in line 25. When operating at such pressure that there is gas separation the gases may be withdrawn through lines 27 and 28 to absorber 29. The product stream passes through line 30 to boron fluoride stripper 31 which is provided with a suitable reheating means or reboiler 32 at its base. Line 30 may be provided with a suitable pressure reducing valve or pump depending upon the relative pressures in settler 24 or stripper 31 respectively. The stripper may operate at a pressure of about 200 to 300 pounds, for example about 250 pounds per square inch, and sufficient heat is supplied to insure the removal of substantially all of the boron fluoride which passes by line 33, compressor 34 (when necessary) and line 28 to the base of absorber 29. We prefer to operate the stripper and absorber at such temperatures and pressures that the use of compressor 34 may be eliminated. Make-up boron fluoride may be supplied from source 35 and introduced into the system by compressor 36 to line 28.

After removal of boron fluoride the product stream passes by line 37 to azeotropic distillation still 38 which is provided with a suitable heating means or reboiler 39 at its base and which may likewise be provided with reflux means at its top. A butane-hydrogen fluoride azeotrope passes overhead through line 40, through condenser 41 to settler 42 which is operated at as low a temperature as can be obtained with available cooling water, preferably well below 100° F. The condensed azeotrope separates into a heavier hydrogen fluoride layer which is withdrawn by line 43 to hydrogen fluoride storage tank 44. The upper butane layer is returned as reflux by line 45 and pump 46 to still 38 and eventually passes downwardly with the product stream. Any propane or lighter gases may be vented through line 47; such gases should contain no boron fluoride but if they do they may be compressed if necessary and introduced through line 28 to absorber 29.

If the product stream withdrawn from the base of azeotropic still 38 through line 48 is substantially free from alkyl fluorides and hydrogen fluoride it may require no special treatment for fluoride removal. A conventional bauxite or equivalent treating system 48' is however preferably employed at this point to insure the removal of any traces of alkyl fluorides and hydrogen fluoride which may be present.

The product stream is then introduced by line 48 into stabilizer or debutanizer tower 49 which is provided with a suitable heater or reboiler 50 at its base and suitable reflux means 51 at its top. In this and other fractionating towers any conventional heating and cooling means may be employed and in actual practice the reflux is usually obtained by condensing the overhead and returning at least a part of the resulting condensate to the top of the tower. A butane stream is withdraw overhead through line 52 and it will consist chiefly of isobutane, which is valuable for producing isooctane by alkylation with butenes and for other purposes.

The stabilized or debutanized product stream then passes by line 53 to fractionating tower 54 which is likewise provided with a reboiler at its base and reflux means at its top and which is operated to take overhead a fraction boiling from about 70 to 140° F., i. e. to take overhead through line 55 pentanes (which consist chiefly of isopentane), neohexane and diisopropyl. The overhead stream is thus an exceptionally high quality aviation gasoline blending stock since it consists chiefly of isopentane and neohexane. The overhead may however contain at least a part of the methyl pentanes although we prefer to include the methyl pentanes as well as the normal hexane in the stream which is withdrawn from the base of tower 54 through line 56 to "recycle" fractionating tower 57 which is provided with suitable reboiler and reflux means. Tower 57 is operated under such conditions as to take overhead through line 58 all hydrocarbons boiling between about 140 and about 260° F., namely methyl pentanes, normal hexane, heptanes, benzene and toluene. It will be understood of course that if and when toluene is a desired product it may be separately fractionated and recovered, preferably by the use of a separate fractionating column. The overhead fraction from tower 57 is passed by line 58 and line 59 to line 15 for recycle to reactor 19. Such recycle materially increases the yield of isopentane, neohexane, etc., while at the same time increasing the yield of ethylbenzene.

The bottoms from tower 57 pass through line 60 to the ethylbenzene fractionating tower 61 which is provided with suitable reboiler and reflux means and from the top of which the ethylbenzene stream is recovered through line 62. A feature of our invention is the production of ethylbenzene rather than xylenes. Any minor amount of xylenes that may be produced may be separated from the ethylbenzene stream by superfractionation, azeotropic distillation or any other means. An ethyltoluene fraction boiling chiefly in the range between about 320 and 335° F. may be withdrawn as a side stream through line 62' from tower 61 for dehydrogenation to produce methylstyrene. A diethylbenzene fraction may be recycled by line 63 via line 59 back to the reactor or introduced by line 63' to absorption tower 29. Heavier material is preferably withdrawn from the system through line 64.

Relatively spent catalyst material may be withdrawn from the reactor through line 65 or from settler 24 through lines 25 and 66 and thence passed through pressure reducing valve 67 to recovery drum 68 which is preferably operated near atmospheric pressure, for example at about 5 pounds gauge pressure and at a temperature of the order of 100 to 160° F. Under these conditions, hydrogen fluoride and dissolved or loosely bound boron fluoride are liberated, passing overhead through line 69. This mixed effluent may pass directly through condenser 70 to receiver 71 where hydrogen fluoride is collected as a liquid and from which boron fluoride may be flashed overhead through line 71' to line 20. Liquid hydrogen fluoride may be pumped from receiver 71 via line 72 to hydrogen fluoride storage tank 44. If there is a tendency for moisture to accumulate in the system we may introduce the effluent from line 69 into silver lined distillation column 73 which is provided with heating means 74 and we may take substantially anhydrous hydrogen fluoride and boron fluoride overhead through line 75 and condenser 70 to receiver 71 returning a portion of condensate through line 76 to serve as reflux. Aqueous hydrogen fluoride-boron fluoride may be withdrawn from the base of column 73 through line 77 and withdrawn from the system through line 78 although a small part of the aqueous acid mixture may be returned through line 21 by pump 79 in order to supply the desired trace of water in the reactor.

Heating of the product in drum 68 results in decomposition of the loosely bound boron fluoride-hydrogen fluoride complex and by removal of the fluoride components and of excess hydrogen fluoride solvent the aromatic hydrocarbons are thrown out of solution. The residue in drum 68, consisting of aromatic hydrocarbons and more-firmly-bound fluoride complex, is withdrawn through line 80 to settler 81 wherein an upper aromatic layer may be recovered from the lower complex layer and passed by line 82, pump 83 and a bauxite system 82' for fluoride removal to line 48, 53 or 56. By removing boron fluoride and hydrogen fluoride from the spent catalyst material and employing the settling or separation step a considerable amount of aromatic hydrocarbons is recovered which would otherwise be lost. The larger the ratio of boron fluoride to hydrogen fluoride which is employed in the reactor the larger will be the amount of aromatics recovered in settler 81.

The complex and tarry material which settles out in settler 81 is withdrawn through line 84 to drum 85 which is provided with heating means 86. This drum is operated at about atmospheric pressure and at a temperature of the order of 230° to 350° F. or more under which conditions the complex is decomposed and boron fluoride and hydrogen fluoride are liberated. The liberated boron fluoride and hydrogen fluoride may be compressed by compressor 87 and returned by lines 20 and 18 to reactor 19, but is preferably introduced through line 20' to the base of absorber 29, the latter arrangement offering the advantage of providing better control on the amount and composition of catalyst entering the reactor. A tarry residue is withdrawn from the system through line 88.

Make-up hydrogen fluoride may be added to the system from source 89 to storage tank 44. Hydrogen fluoride is pumped from this storage tank by pump 90 and passed by line 91 to the upper part of absorber 29 which may operate at a pressure which may be as high as 1000 pounds per square inch and in this particular example may operate at about 240 pounds per square inch. At such pressures and at the relatively low temperature of the order of about 100° F. or lower the boron fluoride is absorbed in or chemically bound to the hydrogen fluoride but the hydrocarbon gases are unabsorbed therein and may be vented from the top of the absorber through line 92. By this means losses of boron fluoride are substantially prevented while the system is being purged from methane and any other light gases which may tend to accumulate therein. It should be understood that make-up hydrogen fluoride may be introduced directly into the top of the absorber and that line 43 and/or 72 may likewise lead to the absorber rather than to a hydrogen fluoride storage tank.

Our invention is not limited to the use of hydrogen fluoride as an absorber, but it is important to note that absorption systems of the type used for hydrogen chloride in isomerization plants are not suitable for boron fluoride recovery, particularly since it is desirable to vent any propane through line 92 rather than from line 47. We have discovered that a most effective absorbent for boron fluoride is an intimate mixture or solution of an aromatic hydrocarbon such as toluene, ethyltoluene, diethylbenzene, or the like with hydrogen fluoride. It appears that boron fluoride chemically reacts with such mixture to form a complex which is soluble in liquid hydrogen fluoride. By utilizing such complex formation to remove boron fluoride, it may be separated from extraneous gases at atmospheric pressure, so that compressor 87 may be eliminated as well as compressor 34.

An effective method of operation is to introduce enough diethylbenzene from line 63' to the upper part of absorber 29 to maintain a liquid hydrocarbon layer above the acid level in the absorber. Intimate mixing can be obtained by spraying hydrofluoric acid laterally or downwardly into this diethylbenzene layer (or by any other means) so that any boron fluoride not absorbed in the lower part of tower 29 will react with the intimate mixture in the top thereof to form complex and be positively prevented from leaving the absorber with extraneous gases. The resulting complex is scrubbed out of the mixture by incoming hydrogen fluoride and carried as a solution therein with the catalyst leaving the absorber through line 17.

Results obtainable by use of our invention are shown by a batch run wherein 298 parts by weight of heptane, 232 parts by weight of benzene, 373 parts by weight of hydrogen fluoride and 19 parts by weight of boron fluoride were introduced into a bomb provided with stirring mechanism and reacted at a temperature of about 330° F. under a pressure which rose to about 1070 pounds per square inch during the reaction time of about 50 minutes. Practically no hydrocarbon gases lighter than propane were produced and the complex formed amounted to only 20 parts by weight. In a similar run employing aluminum chloride-hydrogen chloride catalyst the complex formation amounted to 196 parts by weight, practically ten times the amount of complex that was produced in our hydrogen fluoride-boron fluoride run. This is an extremely important feature of our invention because it effects enormous savings in charging stock and catalyst requirements in addition to the fact that our catalyst may be almost quantitatively recovered while the aluminum chloride complex cannot be recovered by any feasible means.

Of the 32 weight percent of "condensibles" formed approximately 33% was propane and 67% was isobutane with no determinable amount of normal butane production. Thus our process provides a method for producing isobutane of remarkable purity.

The C₅ and heavier hydrocarbons amounted to about 68 weight percent of the total hydrocarbons charged. The analysis of the C₅ and heavier hydrocarbons on a volume percent bases was as follows:

| | |
|---|---:|
| Isopentane | 9.6 |
| Hexanes | 2.5 |
| Heptanes | 25.6 |
| Benzene | 24.6 |
| Toluene | 8.1 |
| Ethylbenzene | 13.6 |
| Ethyltoluene | 6.5 |
| Diethylbenzene | 3.0 |
| Bottoms | 6.5 |

Although some bottoms (high boiling alkyl benzenes) build up in the system and have to be withdrawn it will be seen that by separately withdrawing the isopentane and neohexane as one fraction, ethylbenzene as another fraction and recycling all of the remaining hydrocarbons (except high boiling bottoms and perhaps the ethyltoluene) most of the original charging stock may be converted into ethylbenzene and an extraordinarily high quality aviation gasoline blending stock along with substantial amounts of isobutane.

While we have described a preferred example of our invention in considerable detail it should be understood that our invention is not limited to the specific system or the particular conditions therein recited since many modifications and alternative conditions will be apparent from the above description to those skilled in the art. In some instances, for example, it may be desirable to hydrolyze the complex withdrawn from the bottom of settler 81 through line 84 instead of subjecting it to hydrogen fluoride-boron fluoride recovery. The complex withdrawn through line 84 is a mobile liquid, bright blue in color. It is insoluble in both hexane and benzene but after treatment with water is soluble in these solvents. The hydrolyzed product has drying oil properties and may be utilized for the production of a drying oil or plastic materials instead of for the recovery of hydrogen fluoride and boron fluoride.

We claim:

1. A process which comprises intimately contacting an aromatic hydrocarbon with a normal paraffinic hydrocarbon in the presence of a catalyst consisting essentially of hydrogen fluoride promoted with about 1 to about 20 per cent by weight of boron fluoride at a conversion temperature under a pressure sufficiently high to maintain substantially liquid phase conversion conditions and with sufficient time of contact to effect the production of alkyl aromatic hydrocarbons and isoparaffinic hydrocarbons.

2. The process of claim 1 wherein the normal paraffinic hydrocarbon contains at least 5 carbon atoms in the molecule.

3. A process which comprises intimately contacting an aromatic hydrocarbon with a normally liquid normal paraffinic hydrocarbon in the presence of a catalyst consisting essentially of hydrogen fluoride promoted with about 2 to 20 per cent by weight of boron fluoride at a temperature between about 180° F. and about 400° F. under a pressure sufficiently high to maintain substantially liquid phase conversion conditions and with sufficient time of contact to effect the production of alkyl aromatic hydrocarbons and isoparaffinic hydrocarbons.

4. A process which comprises intimately contacting an aromatic hydrocarbon with a normal paraffinic hydrocarbon in the presence of catalyst consisting essentially of hydrogen fluoride promoted with about 2 to 20% by weight of boron fluoride at a temperature between about 180° F. and about 400° F., under a pressure sufficiently high to maintain substantially liquid phase conversion conditions and with sufficient time of contact to effect the production of alkyl aromatic hydrocarbons and isoparaffins.

5. A hydrocarbon conversion process which comprises contacting a mixture of an aromatic hydrocarbon and a normal paraffin hydrocarbon having at least five carbon atoms per molecule with a catalyst consisting essentially of hydrogen fluoride containing about 2 to 20% by weight of boron fluoride in a conversion zone at a temperature between about 180° F. and about 400° F. under a pressure between about 200 and about 2000 pounds per square inch and sufficiently high to maintain substantially liquid phase conversion conditions with a contact time sufficiently long to effect substantial conversion to produce hydrocarbon products comprising an alkyl aromatic hydrocarbon and an isoparaffin hydrocarbon, and maintaining an aromatic to paraffinic mol ratio in the contacting step within the approximate range of 1:4 to 8:1.

6. The method of producing ethylbenzene which comprises contacting an aromatic hydrocarbon rich in benzene with a normally liquid normal paraffin hydrocarbon and with catalyst consisting essentially of hydrogen fluoride promoted with about 2 to 20 weight percent of boron fluoride in a conversion zone at a temperature between about 180° F. and about 400° F. under sufficient contact time to effect substantial conversion, separating catalyst from reaction products, fractionating the reaction products to obtain an isoparaffin hydrocarbon, a fraction consisting essentially of C₆ and C₇ paraffin and aromatic hydrocarbons, and an ethylbenzene fraction, and recycling the C₆—C₇ paraffin-aromatic fraction to the contacting step.

7. The method of producing ethylbenzene which method comprises contacting a mixture of benzene and normal heptane with a catalyst consisting essentially of hydrogen fluoride promoted by approximately 5 weight percent of boron fluoride at a temperature of about 300° F., at a pressure of about 1000 pounds per square inch, intimately contacting said mixture for a period of time sufficient to effect substantial conversion, separating catalyst material from conversion products and fractionating said conversion products to separate ethylbenzene from higher boiling and lower boiling products.

8. The method of simultaneously producing ethylbenzene and high antiknock rating gasoline blending stock which method comprises contacting an aromatic hydrocarbon comprising benzene with a paraffinic hydrocarbon fraction comprising a straight-chain paraffin hydrocarbon containing at least five carbon atoms per molecule and with a catalyst consisting essentially of hydrogen fluoride promoted by about 2 to 20 weight percent of boron fluoride in a conversion zone at a temperature between about 180° F. and about 400° F. under a pressure sufficient to maintain substantially liquid phase conversion conditions, maintaining intimate contact between said hydrocarbons and catalyst for a period of time sufficient to effect substantial conversion, separating catalyst from resulting products, fractionating substantially catalyst-free products to obtain an isopentane-neohexane fraction, an alkyl benzene fraction and a fraction boiling between neohexane and ethylbenzene, and recycling said last-named fraction to said conversion zone.

9. The method of claim 8 which includes the additional step of fractionating catalyst-free products to obtain an ethyltoluene fraction.

10. A hydrocarbon conversion process which comprises contacting a mixture of aromatic hydrocarbons and normal paraffinic hydrocarbons containing at least five carbon atoms per molecule with a catalyst consisting essentially of hydrogen fluoride promoted by about 2 to 20 weight percent of boron fluoride in a liquid phase conversion zone maintained at conversion temperature, withdrawing products from said conversion zone to a settling zone, returning catalyst from said settling zone to said conversion zone, introducing hydrocarbon-containing products from said settling zone to a boron fluoride stripping zone wherein a stream containing boron fluoride and gaseous hydrocarbons is vaporized, returning boron fluoride from said stripping zone to said conversion zone, removing unvaporized products from said stripping zone to a hydrogen fluoride recovery zone, separating hydrogen fluoride from said products by azeotropic distillation with a normally gaseous paraffin hydrocarbon product in said last-named zone, returning the recovered hydrogen fluoride to the conversion zone and subjecting products from which both boron fluoride and hydrogen fluoride have been removed to a fractionating step.

11. The process of claim 10 which includes the further steps of withdrawing at least a portion of catalyst material to a low pressure zone, subjecting said withdrawn catalyst material to a temperature between about 90° F. and about 200° F. for recovering hydrogen fluoride and boron fluoride therefrom, returning said hydrogen fluoride and boron fluoride to said conversion zone, settling the remaining catalyst material to effect separation of aromatic hydrocarbons from catalyst complex, heating the complex from said settling step to a temperature upwards of 200° F. for decomposing complex and recovering hydrogen fluoride and boron fluoride and returning said hydrogen fluoride and boron fluoride to said conversion zone.

12. The process of claim 10 which includes the further steps of introducing liquid hydrogen fluoride at a low temperature into the top of an absorbing zone, introducing the boron fluoride stream withdrawn from said stripping zone to the base of said absorbing zone, drawing unabsorbed hydrocarbons from the top of said absorbing zone and introducing hydrogen fluoride with absorbed boron fluoride from the base of said absorbing zone into said conversion zone.

13. A hydrocarbon conversion process which comprises contacting a mixture of aromatic hydrocarbons and normal paraffinic hydrocarbons with a catalyst consisting essentially of hydrogen fluoride promoted by about 2 to about 20 weight per cent of boron fluoride in a liquid phase conversion zone maintained at a conversion temperature, withdrawing from said conversion zone catalyst material comprising aromatic hydrocarbons, subjecting said withdrawn catalyst material to temperature between about 90° F. and about 200° F. and separating hydrogen fluoride and boron fluoride therefrom, gravitationally separating aromatic hydrocarbons and catalyst complex from the remaining catalyst material, heating the complex from said settling step to a temperature upwards of 200° F. for decomposing complex and liberating hydrogen fluoride and boron fluoride, and returning hydrogen fluoride and boron fluoride derived from the aforesaid treatment of said catalyst material to said conversion zone.

14. The process of claim 13 wherein the normal paraffinic hydrocarbon is normally liquid.

ARTHUR P. LIEN.
BERNARD H. SHOEMAKER.

REFERENCES CITED

The following references are of record in the file of this patent:

UNITED STATES PATENTS

| Number | Name | Date |
|---|---|---|
| 2,098,045 | Ipatieff et al. | Nov. 2, 1937 |
| 523,715 | Somer | July 31, 1894 |
| 754,978 | Doremus | Mar. 22, 1904 |
| 657,325 | Torchia | Sept. 4, 1900 |
| 1,933,434 | Hofmann et al. | Oct. 31, 1933 |
| 2,088,598 | Ipatieff et al. (I) | Aug. 3, 1937 |
| 2,167,358 | Gleason | July 25, 1939 |
| 2,234,984 | Sachanen et al. | Mar. 18, 1941 |
| 2,290,211 | Schaad | July 21, 1942 |
| 2,333,866 | Komarewsky | Nov. 9, 1943 |
| 2,343,744 | Burk | Mar. 7, 1944 |
| 2,373,303 | Frey et al. | Apr. 10, 1945 |
| 2,378,636 | Iverson | June 19, 1945 |

OTHER REFERENCES

Simons, "Potential Use of Hydrogen Fluoride in Organic Chemical Processes," Ind. Eng. Chem., vol. 32 (Feb. 1940), page 181 (1 page only).